(12) United States Patent
Ahn et al.

(10) Patent No.: US 7,981,960 B2
(45) Date of Patent: *Jul. 19, 2011

(54) THERMOPLASTIC RESIN COMPOSITION HAVING IMPROVED IMPACT RESISTANCE, COLOR DEVELOPMENT AND GOOD FLAME-RETARDANCE

(75) Inventors: Sung Hee Ahn, Seoul (KR); Se Bum Son, Anyang-Si (KR); In Hwan Oh, Seoul (KR); Sung Duk Hwang, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 175 days.

This patent is subject to a terminal disclaimer.

(21) Appl. No.: 12/037,123

(22) Filed: Feb. 26, 2008

(65) Prior Publication Data
US 2008/0221255 A1 Sep. 11, 2008

(30) Foreign Application Priority Data

Mar. 6, 2007 (KR) ........................ 10-2007-0021790
Mar. 6, 2007 (KR) ........................ 10-2007-0021841

(51) Int. Cl.
*C08L 63/00* (2006.01)
*C08K 5/05* (2006.01)

(52) U.S. Cl. ........ 524/502; 524/411; 524/380; 525/117; 525/68; 525/96; 525/191

(58) Field of Classification Search ................. 428/36.9; 524/411, 502, 380; 525/68, 96, 117, 191
See application file for complete search history.

(56) References Cited

U.S. PATENT DOCUMENTS

| 4,994,515 | A | 2/1991 | Washiyama et al. | |
|---|---|---|---|---|
| 5,039,729 | A | 8/1991 | Brackenridge et al. | |
| 6,447,913 | B1 * | 9/2002 | Watanabe et al. | 428/413 |
| 2001/0041772 | A1 | 11/2001 | Masubuchi et al. | |
| 2005/0137311 | A1 | 6/2005 | Muylem et al. | |
| 2008/0088961 | A1 * | 4/2008 | Kushida | 359/893 |
| 2008/0160240 | A1 | 7/2008 | Son et al. | |
| 2008/0221255 | A1 | 9/2008 | Ahn et al. | |
| 2010/0029828 | A1 | 2/2010 | Ahn et al. | |
| 2010/0152372 | A1 | 6/2010 | Oh et al. | |

FOREIGN PATENT DOCUMENTS

| JP | 05-295196 A | 11/1993 |
|---|---|---|
| JP | 06-322200 A | 11/1994 |
| JP | 14-97374 A | 4/2002 |
| JP | 2005-272640 | 10/2005 |
| JP | 2005272640 A * | 10/2005 |
| KR | 10-1991-0000910 A | 1/1991 |
| KR | 910008803 B1 | 10/1991 |
| WO | 2008/082138 A1 | 7/2008 |

OTHER PUBLICATIONS

Suzuhiro Chemica Co., Ltd. Product Info 3-1 (Antimony Trioxide [Fire Cut AT38 AT-3CN AT-3LT AT3CN-LP]) Available Online at: http://www.chemical-suzu hiro.co.jp/EN/pdf/e_prod uct-info[AT3]2.0.pdf.*
International Search Report in commonly owned International Application No. PCT/KR2007/006833, dated Mar. 25, 2008.
Machine Translation of JP 2005-272640A.
Suzuhiro Chemica Co., Ltd. Product Info 3-1 (Antimony Trioxide [Fire Cut AT38 AT-3CN AT-3LT AT3CN-LP]) Available Online at: http://www.chemical-suzuhiro.co.jp/EN/pdf/e_product-into[AT3]2.0.pdf.
Office Action in commonly owned U.S. Appl. No. 11/965,013, mailed on Jul. 1, 2009.
Office Action in commonly owned U.S. Appl. No. 11/965,013, mailed on Jan. 28, 2010.
U.S. Patent Office Advisory Action in commonly owned U.S. Appl. No. 11/965,013 dated May 7, 2010.
Office Action in commonly owned U.S. Appl. No. 12/647,620, mailed on Jan. 31, 2011, pp. 1-10.
Office Action in commonly owned U.S. Appl. No. 12/628,258, mailed on Mar. 24, 2011, pp. 1-22.

* cited by examiner

*Primary Examiner* — Michael M Bernshteyn
(74) *Attorney, Agent, or Firm* — Summa, Additon & Ashe, P.A.

(57) ABSTRACT

A thermoplastic resin composition can include (A) about 30 to about 99 parts by weight of an epoxy group-containing styrenic polymer comprising ($A_1$) about 5 to about 100% by weight of an epoxy group-containing vinyl copolymer and ($A_2$) about 0 to about 95% by weight of a rubber modified styrenic copolymer resin; and (B) about 1 to about 70 parts by weight of a polyester resin. The resin composition may further comprise (C) about 3 to about 20 parts by weight of a bromine-containing flame retardant, per 100 parts by weight of a base resin comprising (A) and (B); and (D) about 0.1 to about 6 parts by weight of a flame retardant aid, per 100 parts by weight of a base resin comprising (A) and (B).

19 Claims, 1 Drawing Sheet
(1 of 1 Drawing Sheet(s) Filed in Color)

THERMOPLASTIC RESIN COMPOSITION HAVING IMPROVED IMPACT RESISTANCE, COLOR DEVELOPMENT AND GOOD FLAME-RETARDANCE

CROSS-REFERENCE TO RELATED APPLICATIONS

This non-provisional application claims priority under 35 USC Section 119 from Korean Patent Application No. 2007-21790, filed Mar. 6, 2007, and Korean Patent Application No. 2007-21841, filed Mar. 6, 2007, each of which is hereby incorporated by reference in its entirety.

FIELD OF THE INVENTION

The present invention relates to a thermoplastic resin composition having improved impact resistance, color development and good flame-retardance.

BACKGROUND OF THE INVENTION

Generally, styrenic resins can have good transparency, heat stability and mechanical properties and have accordingly been widely used. In particular, flameproof rubber modified styrenic resins can be used to produce housings for electric/electronic goods because of their desirable properties. In order to provide styrenic resins with mechanical strength, rubber components are typically added. Further, bromic flame retardants and antimony trioxide are typically added to obtain flame retardancy. However, these resin compositions in which a flame retardant is added may have poor color development due to the difference in refractive index between the flame retardant and the styrenic resin.

In order to solve the above problems, antimony trioxide having a small size of about 0.02 to 0.1 μm, antimony pentoxide having a small size of about 0.02 to 0.1 μm instead of antimony trioxide, or a combination of conventional antimony trioxide and fine particles of antimony pentoxide have been commonly used.

However, the above methods may have limited applicability because these methods all employ antimony oxide fine particles. So, it is necessary to develop new techniques that can easily improve color development or colorability.

Polyester resins typically have a structure including short chains, and thus may not bend easily. Accordingly, polyester resins can have good rigidity, electrical properties, weather resistance, heat resistance, and the tensile strength of polyester resins may not be affected even after long term exposure to high temperatures. Further, crystalline polyester resins have good resistance to various oils, such as diesel oil.

However, the properties of polyester resins can degrade when they are exposed to acid or alkali for a long time at a high temperature due to ester bonds in the polyester chain. Thus, reinforcing agents such as glass fiber can be added to the polyester resins when polyester resins are employed as a structural material. If reinforcing agents are not added, it is difficult to use polyester resins as a structural material produced by injection molding.

It can be particularly difficult to impart flame retardancy to polyester resin because of flame dripping due to very rapid degradation of the polymer during combustion. Accordingly, in order to obtain flame retardancy, reinforcing agents such as glass fiber are added to polyester resin, because polyester resin alone is not flame retardant.

SUMMARY OF THE INVENTION

The present inventors have developed a thermoplastic resin composition having improved impact resistance, color development and good flame-retardance. The thermoplastic resin composition comprises an epoxy group-containing styrenic polymer and a polyester resin. The thermoplastic resin can be useful as a structural material. The thermoplastic resin composition of the invention can also be useful as an external material of electric/electronic goods.

One aspect of the invention provides a thermoplastic resin composition comprising (A) about 30 to about 99 parts by weight of an epoxy group-containing styrenic polymer comprising ($A_1$) about 5 to about 100% by weight of an epoxy group-containing vinyl copolymer and ($A_2$) about 0 to about 95% by weight of a rubber modified styrenic copolymer resin; and (B) about 1 to about 70 parts by weight of a polyester resin.

In another embodiment of the present invention, the thermoplastic resin composition may include (A) about 30 to about 99 parts by weight of an epoxy group-containing styrenic polymer comprising ($A_1$) about 5 to about 100% by weight of an epoxy group-containing vinyl copolymer and ($A_2$) about 0 to about 95% by weight of a rubber modified styrenic copolymer resin; (B) about 1 to about 70 parts by weight of a polyester resin; (C) about 3 to about 20 parts by weight of a bromine-containing flame retardant, per 100 parts by weight of a base resin comprising (A) and (B); and (D) about 0.1 to about 6 parts by weight of a flame retardant aid, per 100 parts by weight of a base resin comprising (A) and (B).

In exemplary embodiments of the invention, the epoxy group-containing vinyl polymer ($A_1$) can be prepared by polymerizing a mixture comprising about 0.001 to about 5.0 mol % of an epoxy group-containing unsaturated epoxy compound ($A_{11}$) and about 99.999 to about 95 mol % of a vinyl compound ($A_{12}$).

In exemplary embodiments of the invention, the rubber modified styrenic copolymer resin ($A_2$) comprises ($A_{21}$) about 20 to about 100% by weight of a graft copolymer resin and ($A_{22}$) about 0 to about 80% by weight of a copolymer resin.

In exemplary embodiments of the invention, the polyester resin (B) may be a polyester resin in which inorganic particles are mixed therein.

The resin composition may further comprise additives such as heat stabilizers, dyes, pigments, lubricants, releasing agents, dispersant, anti-dripping agents, weather stabilizers, inorganic fillers, inorganic fibers, and the like, and combinations thereof.

Another aspect of the invention provides an article molded from the foregoing resin composition. In exemplary embodiments of the invention, the molded article can have an Izod notch impact strength of about 18 kgf·cm/cm or more at 23° C. measured in accordance with ASTM D-256 using a ¼" thick test sample.

In other exemplary embodiments of the invention, the molded article can have a flame retardancy of V0 according to UL 94 VB at a sample thickness of 1/16", 1/12", 1/10" and ⅛" respectively; *L value of less than about 80, *a value of more than about 15, *b value of less than about 75 measured by means of a Minolta CM-3700 D spectrophotometer at a light source of D65 according to light sources using a 1976 CIE Lab; and an Izod notch impact strength of about 12 kgf·cm/cm or more at 23° C. measured in accordance with ASTM D-256 using a ¼" thick test sample.

Another aspect of the invention provides a pellet extruded from the foregoing resin composition.

Another aspect of the invention provides an electric/electronic housing molded from the foregoing resin composition.

BRIEF DESCRIPTION OF THE DRAWINGS

The patent or application file contains at least one drawing or photograph executed in color. Copies of this patent or patent application publication with color drawing(s) or photograph(s) will be provided by the Office upon request and payment of the necessary fee.

DETAILED DESCRIPTION OF THE INVENTION

Figure 1A:
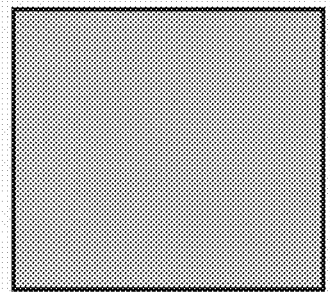
FIG. 1 (*a*) is a photograph of a test specimen prepared in Example 23 captured with a digital camera, and FIG. 1 (*b*) is a test specimen prepared in Example 24 captured with a digital camera.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Epoxy Group-Containing Styrenic Polymer

The epoxy group-containing styrenic polymer is part of a base resin including the epoxy group-containing styrenic polymer and a polyester resin, discussed in more detail below. The epoxy group-containing styrenic polymer is used in the thermoplastic resin composition of the invention in an amount of about 30 to about 99 parts by weight, based on the total weight of the thermoplastic resin composition.

The epoxy group-containing styrenic polymer of the present invention comprises ($A_1$) an epoxy group-containing vinyl copolymer and ($A_2$) a rubber modified styrenic copolymer resin. In exemplary embodiments, the epoxy group-containing styrenic polymer comprises ($A_1$) about 5 to about 100% by weight of an epoxy group-containing vinyl copolymer and ($A_2$) about 0 to about 95% by weight of a rubber modified styrenic copolymer resin. The epoxy group-containing vinyl copolymer comprises about 0.001 to about 5.0 mol % of an epoxy group.

($A_1$) Epoxy Group-Containing Vinyl Copolymer

The epoxy group-containing vinyl copolymer of the present invention can be prepared by polymerizing a monomer mixture comprising an epoxy group-containing unsaturated epoxy compound ($A_{11}$) and a vinyl compound ($A_{12}$) so that the unsaturated epoxy group is present in the vinyl copolymer. The monomer mixture may comprise about 0.001 to about 5.0 mol % of an epoxy group-containing unsaturated epoxy compound ($A_{11}$) and about 99.999 to about 95 mol % of a vinyl compound ($A_{12}$).

($A_{11}$) Epoxy Compound

The epoxy compound used in the invention can be represented by the following chemical formula 1.

[Chemical formula 1]

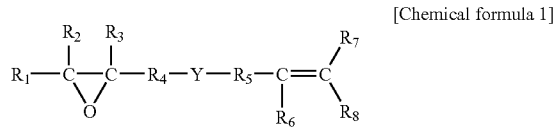

wherein:

$R_1, R_2, R_3, R_6, R_7$ and $R_8$ are each independently hydrogen, saturated or unsaturated $C_1$-$C_{12}$ alkyl, $C_6$-$C_{14}$ aryl, or alkyl-substituted aryl (for example saturated or unsaturated $C_1$-$C_{12}$ alkyl-substituted $C_6$-$C_{14}$ aryl); and Y is an ether group (—O—), carboxyl group (—O—[C=O]—, —[O=C]—O—), $C_1$-$C_{12}$ alkylene, $C_6$-$C_{14}$ arylene, or alkyl-substituted arylene (for example saturated or unsaturated $C_1$-$C_{12}$ alkyl-substituted $C_6$-$C_{14}$ arylene);

with the proviso that when Y is an ether group (—O—) or carboxyl group (—O—[C=O]—, —[O=C]—O—), $R_4$ and $R_5$ are each independently $C_1$-$C_{12}$ alkylene, $C_6$-$C_{14}$ arylene or alkyl-substituted arylene (for example, saturated or unsaturated $C_1$-$C_{12}$ alkyl-substituted $C_6$-$C_{14}$ arylene); and when Y is $C_1$-$C_{12}$ alkylene, $C_6$-$C_{14}$ arylene or alkyl-substituted arylene, Y represents (R4-Y-R5) structure.

Examples of the epoxy compound may include, but are not limited to, epoxy alkyl acrylate, allyl glycidyl ester, aryl glycidyl ester, glycidyl methacrylate, glycidyl acrylate, butadiene monoxide, vinyl glycidyl ether, glycidyl itaconate, and the like. These epoxy compounds can be used alone or in combination with one another.

In exemplary embodiments of the invention, the epoxy compound is added as a comonomer in an amount of about 0.001 to about 5 mol %, for example about 0.1 to about 5 mol %, and as another example about 1 to about 5 mol %. If the amount of the epoxy compound is less than about 0.001 mol %, it can be difficult to improve impact strength. When the amount of the epoxy compound exceeds about 5 mol %, there can be a problem of gelation during an extrusion process and insufficient flame retardancy.

($A_{12}$) Vinyl Compound

The vinyl compound of the present invention may comprise aromatic vinyl monomers and a monomer copolymerizable with the aromatic vinyl monomer.

Examples of the aromatic vinyl monomers may include, but are not limited to, styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene and the like. These aromatic vinyl monomers can be used alone or in combination with one another.

The monomer copolymerizable with the aromatic vinyl monomer may be used alone or in combination with one or more other copolymerizable monomers. Examples of the monomer copolymerizable with the aromatic vinyl monomer may include, but are not limited to, unsaturated nitrile monomers such as acrylonitrile, methacrylonitrile and ethacrylonitrile, and the like, and combinations thereof.

The ratio of the aromatic vinyl monomers to the monomer copolymerizable with the aromatic vinyl monomer can be determined by the ratio of monomers of the rubber modified styrenic copolymer resin ($A_2$) excluding rubber and compatibility. The vinyl compound can include about 40 to about 90% by weight of an aromatic vinyl monomer and about 10 to about 60% by weight of a monomer copolymerizable with the aromatic vinyl monomer. As another example, the vinyl compound can include about 50 to about 80% by weight of aromatic vinyl monomer and about 20 to about 50% by weight of a monomer copolymerizable with the aromatic vinyl monomer. If the amount of the aromatic vinyl monomers is less than about 40% by weight, the viscosity can significantly rise, which can negatively affect molding performance. When the amount of the aromatic vinyl monomers is more than about 90% by weight, it can be difficult to improve mechanical strength.

Other monomers such as acrylic acid, methacrylic acid, maleic anhydride, N-substituted maleimide, and the like, and combinations thereof may be optionally contained in the vinyl compound ($A_{12}$) to improve processability and heat resistance. The monomers for providing processability and heat resistance may be used in amount of about 0 to about 30% by weight, for example about 1 to about 20% by weight, and as another example about 2 to about 15% by weight, based on the total weight of the vinyl compound ($A_{12}$).

($A_2$) Rubber Modified Styrenic Copolymer Resin

The rubber modified styrenic copolymer resin according to the present invention can be a polymer in which rubber phase polymers are dispersed in the form of particles in a matrix (continuous phase) comprising an aromatic vinyl polymer. In exemplary embodiments of the invention, the rubber modified aromatic vinyl resins may be prepared by polymerizing the aromatic vinyl group-containing monomers with rubbers. In exemplary embodiments, other monomers copolymerizable with the aromatic vinyl monomers may also be employed along with the aromatic vinyl monomers.

The rubber modified styrenic copolymer resin may be prepared by methods such as emulsion polymerization, suspension polymerization, bulk polymerization, and by extrusion of a graft copolymer resin and a copolymer resin. In bulk polymerization, both a graft copolymer resin and a copolymer resin are prepared together in one process. In other polymerizations, the graft copolymer resin and the copolymer resin may be prepared separately. Regardless of the polymerization technique used, the rubber content in a final rubber modified styrenic copolymer resin can be about 5 to about 30% by weight.

In exemplary embodiments of the invention, the Z-average size of rubber particles of the rubber modified styrenic copolymer resin ($A_2$) can range from about 0.1 to about 6.0 μm, for example from about 0.25 to about 3.5 μm, to obtain desirable properties during blending of the rubber modified styrenic copolymer resin and polyester resin.

In the rubber modified styrenic copolymer resin of the present invention, the graft copolymer resin can be used alone or in combination with the copolymer resin, depending on the compatibility thereof.

($A_{21}$) Graft Copolymer Resin

The graft copolymer resin ($A_{21}$) may be prepared by graft-polymerizing rubbery polymer, aromatic vinyl monomer, monomer copolymerizable with the aromatic vinyl monomer and optionally other monomer(s) imparting processability and heat resistance.

Examples of the rubbery polymers may include, but are not limited to, diene rubbers such as polybutadiene, poly(styrene-butadiene), poly(acrylonitrile-butadiene), and the like; saturated rubbers in which hydrogen is added to a diene rubber; isoprene rubbers; acryl rubbers such as polybutyl acrylic acid; and terpolymers of ethylene-propylene-diene (EPDM), and the like, and combinations thereof. The content of rubbery polymer in the graft copolymer resin may be about 5 to about 65 parts by weight, for example about 20 to about 60 parts by weight, based on the total weight of the graft copolymer resin ($A_{21}$). The average size of the rubber particles can range from about 0.1 to about 4 μm taking into account the desired impact strength and appearance of the resin composition.

Examples of the aromatic vinyl monomer may include, but are not limited to, styrene, α-methyl styrene, β-methyl styrene, p-methyl styrene, p-t-butylstyrene, ethylstyrene, vinyl xylene, monochlorostyrene, dichlorostyrene, dibromostyrene, vinyl naphthalene and the like, and combinations thereof. The aromatic vinyl monomer may be used in an amount of about 35 to about 95 parts by weight based on the total weight of the graft copolymer resin ($A_{21}$).

The graft copolymer resin ($A_{21}$) can include at least one other monomer copolymerizable with the aromatic vinyl monomer. Examples of monomers which may be copolymerized with the aromatic vinyl monomers may include, but are not limited to, a cyanide vinyl-containing compound such as acrylonitrile or an unsaturated nitrile-containing compound such as methacrylonitrile and ethacrylonitrile. These monomers may be used alone or in combination of two or more. The copolymerizable monomer with the aromatic vinyl monomer may be used in an amount of about 1 to about 20 parts by weight, based on the total weight of the graft copolymer resin ($A_{21}$).

Examples of the monomer imparting processability and heat resistance may include without limitation acrylic acid, methacrylic acid, maleic anhydride, N-substituted maleimide, and the like, and combinations thereof. The monomer imparting process ability and heat resistance may be used in an amount of about 0 to about 15 parts by weight, based on the total weight of the graft copolymer resin ($A_{21}$).

($A_{22}$) Copolymer Resin

The copolymer resin of the present invention may be prepared by copolymerizing aromatic vinyl monomer, monomer copolymerizable with the aromatic vinyl monomer and optionally other monomer(s) imparting processability and heat resistance. The monomer ratio may be adjusted depending on the monomer ratio of the graft copolymer resin ($A_{21}$) excluding rubber and compatibility.

Examples of the aromatic vinyl monomer may include, but are not limited to, styrene, α-methyl styrene, β-methyl styrene, p-methyl styrene, p-t-butyl styrene, ethylstyrene, vinyl xylene, monochlorostyrene, dichlorostyrene, dibromostyrene, vinyl naphthalene, and the like, and combinations thereof. The aromatic vinyl monomer can be used in an amount of about 60 to about 90 parts by weight, based on the total weight of the copolymer resin ($A_{22}$).

Examples of the monomer copolymerizable with the aromatic vinyl monomer may be, for example, a vinyl cyanide compound such as acrylonitrile or an unsaturated nitrile compound such as ethacrylonitrile and methacrylonitrile, and may be used alone or in combination of two or more. The amount of the monomer copolymerizable with the aromatic vinyl monomer can be about 10 to about 40 parts by weight, based on the total weight of the copolymer resin ($A_{22}$).

Examples of the monomers imparting processability and heat resistance may include without limitation acrylic acid, methacrylic acid, maleic anhydride, N-substituted maleimide and the like, and combinations thereof. The amount of the monomers imparting processability and heat resistance can be about 0 to about 30 parts by weight, based on the total weight of the copolymer resin ($A_{22}$).

In exemplary embodiments of the invention, the rubber modified styrenic copolymer resins can be copolymer resins of acrylonitrile-butadiene-styrene (ABS), copolymer resins of acrylonitrile-ethylenepropylene rubber-styrene (AES), copolymer resins of acrylonitrile-acrylic rubber-styrene (AAS), and the like, and combinations thereof.

The rubber modified styrenic copolymer resin ($A_2$) can include about 20 to about 100% by weight of the graft copolymer resin ($A_{21}$) and about 0 to about 80% by weight of the copolymer resin ($A_{22}$).

(B) Polyester Resin

The polyester used in the present invention is polyester resin having an intrinsic viscosity of about 0.3 to about 1.0 g/dL or a copolymer thereof. If the intrinsic viscosity is less than about 0.3 g/dL, it can be difficult to obtain sufficient impact strength. If the intrinsic viscosity is more than about 1.0 g/dL, it can be difficult to obtain the resin composition according to the present invention.

In exemplary embodiments of the invention, the polyester resin may be prepared by condensation polymerization reaction of acid or ester such as terephthalic acid (TPA), isophthalic acid (IPA), 1,2-naphthalene dicarboxylic acid, 1,4-naphthalenedicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalenedicarboxylic acid, aromatic dicarboxylate in which acid is substituted with a dimethyl group such as dimethyl terephthalate (DMT) and dimethyl isophthalate, alkyl ester of naphthalene dicarboxylate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and combinations thereof; and diols having 2 to 12 carbon atoms such as ethylene glycol, 1,2-propylene glycol, 1,3-propylene glycol, 2,2-dimethyl-1, 3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like, and combinations thereof. The condensation polymerization reaction can be easily carried out by a person of ordinary skill in the art.

In exemplary embodiments of the invention, the polyester resin (B) may be a polyester resin in which inorganic particles are mixed therein. Examples of suitable inorganic particles useful in the invention can include without limitation titanium dioxide ($TiO_2$), silicone dioxide ($SiO_2$), aluminum hydroxide ($Al(OH)_3$) and the like, and combinations thereof.

In the present invention, the polyester resin is part of a base resin including the polyester resin and the epoxy group containing styrenic polymer and is used in the thermoplastic resin composition in an amount of about 1 to about 70 arts by weight, for example about 5 to about 50 parts by weight, and as another example about 10 to about 40 parts by weight, based on the total weight of the thermoplastic resin composition. If the amount of the polyester is more or less than the above range, the resin composition obtained therefrom may have low impact strength and flame retardancy.

(C) Bromine-Containing Flame Retardant

The resin composition of the present invention may further comprise a bromine-containing flame retardant to improve flame retardancy.

The bromine-containing flame retardant of the present invention can be a compound containing bromine in an amount of about 40 to about 87% by weight.

Examples of the bromine-containing flame retardant may include without limitation tetrabromobisphenol A, decabromodiphenyl oxide, decabrominated diphenyl ethane, 1,2-bis(tribromophenyl) ethane, brominated epoxy oligomer having a molecular weight of about 600 to about 8,000, octabromotrimethylphenyl indane, bis(2,3-dibromopropyl ether), tris(tribromophenyl)triazine, brominated aliphatic or aromatic hydrocarbon, and the like. These bromine-containing flame retardant may be used alone or in combination of two or more.

The bromine-containing flame retardant can be used in an amount of about 3 to about 20 parts by weight, for example about 5 to about 17 parts by weight, per 100 parts by weight of a base resin comprising (A) and (B).

(D) Flame Retardant Aid

The flame retardant aid of the present invention contains antimony. In exemplary embodiments of the invention, the flame retardant aid comprises antimony in an amount of about 75 to about 87% by weight. In exemplary embodiments of the invention, the flame retardant aid is antimony oxide. Examples of the antimony oxide may include without limitation antimony trioxide, antimony pentoxide and combinations thereof.

For antimony trioxide, at least 50% of the antimony trioxide particles can have a size of about 0.01 to about 6 μm, for example about 0.02 to about 3.0 μm.

For antimony pentoxide, at least 50% of the antimony pentoxide particles can have a size of about 0.01 to about 1 μm, for example about 0.02 to about 0.5 μm.

The flame retardant aid of the present invention may be used in an amount of about 0.1 to about 6 parts by weight, for example about 1 to about 4 parts by weight, per 100 parts by weight of a base resin comprising (A) and (B).

Other additives may be included in the resin composition of the present invention. Examples of such additives include without limitation heat stabilizers, dyes and pigments, lubricants, releasing agents, dispersant, anti-dripping agents, weather stabilizers, inorganic fillers, inorganic fibers, and the like, and combinations thereof.

The resin composition according to the present invention can be prepared by a conventional process. For example, all the components and additives can be mixed together and extruded through an extruder and can be prepared in the form of pellets.

Another aspect of the invention provides an article molded from the foregoing resin composition. In exemplary embodiments of the invention, the molded article can have an Izod notch impact strength of about 18 kgf·cm/cm or more at 23° C. measured in accordance with ASTM D-256 using a ¼" thick test sample.

In other exemplary embodiments of the invention, the molded article can have a flame retardancy of V0 according to UL 94 VB at a sample thickness of 1/16", 1/12", 1/10" and 1/8" respectively; *L value of less than about 80, *a value of more than about 15, *b value of less than about 75 measured by means of a Minolta CM-3700 D spectrophotometer at a light source of D65 according to light sources using a 1976 CIE Lab; and an Izod notch impact strength of about 12 kgf·cm/cm or more at 23° C. measured in accordance with ASTM D-256 using a ¼" thick test sample.

The resin composition of the present invention can be molded into various products. The resin composition of the invention can be particularly suitable for the production of electric or electronic housings, computer or office equipment housings, structural materials and the like.

The invention may be better understood by reference to the following examples which are intended for the purpose of illustration and are not to be construed as in any way limiting the scope of the present invention, which is defined in the claims appended hereto.

EXAMPLES (A1) Epoxy Group-Containing Vinyl Copolymer (A1-1) Epoxy Group-Containing Vinyl Copolymer (GMA 0.1 mol %—SAN)

To a mixture comprising 100 parts by weight of monomer mixture including 0.1 mol % of glycidyl methacrylate and 99.9 mol % of vinyl compound including 70 parts by weight of styrene and 30 parts by weight of acrylonitrile and 120 parts by weight of deionized water are added 0.2 parts by weight of azobisisobutyronitrile, 0.4 parts by weight of tricalcium phosphate, and 0.2 parts by weight of mercaptan-containing chain transfer agent. Then the temperature of the mixture is increased from room temperature to 80° C. for 60 minutes, maintained at this temperature for 180 minutes, and epoxy group-containing styrene-acrylonitrile copolymer resin (GMA-SAN) is obtained. The resultant product is washed, dehydrated and dried to obtain epoxy group-containing styrene-acrylonitrile copolymer resin (GMA-SAN) in the form of powder.

(A1-2) Epoxy Group-Containing Vinyl Copolymer (GMA 0.3 mol %—SAN)

GMA 0.3 mol %—SAN is prepared in the same manner as in GMA 0.1 mol %—SAN (A1-1) except that a monomer mixture including 0.3 mol % of glycidyl methacrylate and 99.7 mol % of vinyl compound including 70 parts by weight of styrene and 30 parts by weight of acrylonitrile is used.

(A1-3) Epoxy Group-Containing Vinyl Copolymer (GMA 0.5 mol %—SAN)

GMA 0.5 mol %—SAN is prepared in the same manner as in GMA 0.1 mol %—SAN (A1-1) except that a monomer mixture including 0.5 mol % of glycidyl methacrylate and 99.5 mol % of vinyl compound including 70 parts by weight of styrene and 30 parts by weight of acrylonitrile is used.

(A1-4) Epoxy Group-Containing Vinyl Copolymer (GMA 0.7 mol %—SAN)

GMA 0.7 mol %—SAN is prepared in the same manner as in GMA 0.1 mol %—SAN (A1-1) except that a monomer mixture including 0.7 mol % of glycidyl methacrylate and 99.3 mol % of vinyl compound including 70 parts by weight of styrene and 30 parts by weight of acrylonitrile is used.

(A1-5) Epoxy Group-Containing Vinyl Copolymer (GMA 2.0 mol %—SAN)

GMA 2.0 mol %—SAN is prepared in the same manner as in GMA 0.1 mol %—SAN (A1-1) except that a monomer mixture including 2.0 mol % of glycidyl methacrylate and 98.0 mol % of vinyl compound including 70 parts by weight of styrene and 30 parts by weight of acrylonitrile is used.

(A1-6) Epoxy Group-Containing Vinyl Copolymer (GMA 5.0 mol %—SAN)

GMA 5.0 mol %—SAN is prepared in the same manner as in GMA 0.1 mol %—SAN (A1-1) except that a monomer mixture including 5.0 mol % of glycidyl methacrylate and 95.0 mol % of vinyl compound including 70 parts by weight of styrene and 30 parts by weight of acrylonitrile is used.

(A1-7) Epoxy Group-Containing Vinyl Copolymer (GMA 10.0 mol %—SAN)

GMA 10.0 mol %—SAN is prepared in the same manner as in GMA 0.1 mol %—SAN (A1-1) except that a monomer mixture including 10.0 mol % of glycidyl methacrylate and 90.0 mol % of vinyl compound including 70 parts by weight of styrene and 30 parts by weight of acrylonitrile is used.

(A2) Rubber Modified Styrene Resin $(A_{21})$ Graft Copolymer Resin 50 parts of butadiene rubber latex (solid content), 36 parts of styrene, 14 parts of acrylonitrile, and 150 parts of deionized water are mixed. To the mixture, 1.0 part of potassium oleate, 0.4 parts of cumen hydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain g-ABS latex. To the g-ABS latex, 0.4 parts of sulfuric acid is added, coagulated and dried to obtain graft ABS copolymer resin (g-ABS) in powder form.

$(A_{22})$ Copolymer Resin 75 parts of styrene, 25 parts of acrylonitrile, 120 parts of deionized water and 0.2 parts of azobisisobutylonitrile (AIBN) are mixed. To the mixture, 0.4 parts of tricalcium-phosphate and 0.2 parts of mercaptan-containing chain transfer agent are added. The resultant solution is heated to 80° C. for 90 minutes and kept for 180 minutes. The resultant is washed, dehydrated and dried to obtain styrene-acrylonitrile copolymer resin (SAN) in powder form.

(B) Polyester (B1) Polyester resin having an intrinsic viscosity of 0.76 g/dL (product name: A1100) manufactured by Anychem Company is used.

(B2) Recycled polyester resin having an intrinsic viscosity of 0.72 g/dL (product name: Clear PET Flake) manufactured by Samyang Company is used.

(B3) Polyester resin having an intrinsic viscosity of 0.65 g/dL (product name: PET SD) manufactured by Huvis Company is used.

(B2) Recycled polyester resin having an intrinsic viscosity of 0.55 g/dL is used.

(C) Flame Retardant (C1) Tetrabromobisphenol A (TBBA): SAYTEX RB 100 manufactured by Albemarle Corporation, US, is used.

(C2) Decabromodiphenyloxide (DBDPO): SAYTEX 102E manufactured by Albemarle Corporation, US, is used.

(C3) Decabrominated diphenylethane (DBDPE): SAYTEX 8010 manufactured by Albemarle Corporation, US, is used.

(C4) Brominated epoxy oligomer having a molecular weight of 600 to 8000: ECX-30 manufactured by DIC, Japan, is used.

(C5) Tris(tribromophenyl)triazine: FR-245 manufactured by ICL Company is used.

(D) Flame Retardant Aid (D1) Antimony trioxide (product name: ANTIS-W) manufactured by Insung Antimony Co., Ltd. of Korea is used.

(D2) Antimony pentoxide (product name: DP6085) manufactured by NYACOL Co., Ltd., US, is used.

(E) Colorant (E1) YELLOW: MACROLEX YELLOW G manufactured by LANXESS Corporation is used.

(E2) RED: SOLVENT RED 135 manufactured by CLARIANT Company is used.

Impact Strength Test

Example 1-8 and Comparative Example 1-4

The components as shown in Table 1 are mixed with a Hansel mixer for 3 to 10 minutes to prepare a mixture. The mixture is fed into a conventional twin screw extruder with a speed of 60 kg/hr and extruded at 250° C. at a screw speed of 250 rpm as pellets. The resin pellets are molded into test specimens using a 10 oz injection molding machine at 250° C. with a barrel temperature of 80° C. The Izod impact strengths of the test specimens are measured in accordance with ASTM D-256 standard after leaving the specimens at 23° C. and 50% relative humidity for 40 hours, and the results are shown in Table 1 (¼" notch, kgf cm/cm).

TABLE 1

| | | | Examples | | | | | | | | Comp. Examples | | | |
|---|---|---|---|---|---|---|---|---|---|---|---|---|---|---|
| | | | 1 | 2 | 3 | 4 | 5 | 6 | 7 | 8 | 1 | 2 | 3 | 4 |
| A | A₁ | A1-2 | — | — | — | — | 34 | — | — | — | — | — | — | — |
| | | A1-3 | 60 | 50 | 30 | 10 | — | 34 | — | — | — | 74 | — | — |
| | | A1-4 | — | — | — | — | — | — | 34 | — | — | — | — | — |
| | | A1-5 | — | — | — | — | — | — | — | 34 | — | — | — | — |
| | A₂ | A21 | 30 | 30 | 30 | 30 | 26 | 26 | 26 | 26 | 26 | 26 | — | 26 |
| | | A22 | — | — | — | — | — | — | — | — | 74 | — | — | 34 |
| | B1 | | 10 | 20 | 40 | 60 | 40 | 40 | 40 | 40 | — | — | 100 | 40 |
| | Izod impact strength | | 18 | 23 | 35 | 30 | 30 | 35 | 38 | 38 | 15 | 9 | 3 | 7 |

As shown in Table 1, it can be seen that Comparative Examples 1, 3 and 4 not employing an epoxy group-containing vinyl copolymer (A1) of the present invention exhibit poor impact strength. Further, Comparative Example 2 not using the polyester (B) also shows deteriorated impact strength. However Examples employing both epoxy group-containing vinyl copolymer (A1) and polyester (B) show high impact strength.

Flame Retardancy Test

Examples 8-22

The components as shown in Table 2 are mixed with a Hansel mixer for 3 to 10 minutes to prepare a mixture. The mixture is fed into a conventional twin screw extruder with a speed of 30 to 60 kg/hr and extruded at 180 to 280° C. at a screw speed of 150 to 300 rpm as pellets. The resin pellets are dried at 80° C. for 3 hours, and molded into test specimens using a 6 oz injection molding machine at 180 to 280° C. with a barrel temperature of 40 to 80° C. The flame retardancy of the test specimens is measured in accordance with UL 94 VB after leaving the specimens at 23° C. and 50% relative humidity for 40 hours, and the Izod impact strengths of the test specimens are measured in accordance with ASTM D-256 standard (¼" notch, kgf·cm/cm). The results are shown in Table 2.

TABLE 2

| | | | Examples | | | | | | | | | | | | | |
|---|---|---|---|---|---|---|---|---|---|---|---|---|---|---|---|---|
| | | | 8 | 9 | 10 | 11 | 12 | 13 | 14 | 15 | 16 | 17 | 18 | 19 | 20 | 21 | 22 |
| Epoxy group-containing vinyl copolymer | A₁ | A1-1 | 60 | 40 | 20 | 10 | 25 | — | — | — | — | — | — | — | — | — | — |
| | | A1-4 | — | — | — | — | — | 25 | — | 20 | 20 | 20 | 20 | 20 | 20 | 20 | 20 |
| | | A1-6 | — | — | — | — | — | — | 25 | — | — | — | — | — | — | — | — |
| | | A1-7 | — | — | — | — | — | — | — | — | — | — | — | — | — | — | — |
| Rubber modified styrene resin | A₂ | A21 | 30 | 30 | 30 | 20 | 35 | 35 | 35 | 30 | 30 | 30 | 30 | 30 | 30 | 30 | 30 |
| | | A22 | — | — | — | — | — | — | — | 10 | 10 | 10 | 10 | 10 | 10 | 10 | 10 |
| Polyester | | B1 | 10 | 30 | 50 | 70 | 40 | 40 | 40 | 40 | 40 | 40 | 40 | 40 | — | — | — |
| | | B2 | — | — | — | — | — | — | — | — | — | — | — | — | 40 | — | — |
| | | B3 | — | — | — | — | — | — | — | — | — | — | — | — | — | 40 | — |
| | | B4 | — | — | — | — | — | — | — | — | — | — | — | — | — | — | 40 |
| Flame retardant | | C1 | — | — | — | — | — | — | — | 19 | — | — | — | — | — | — | — |
| | | C2 | 13 | 13 | 13 | 13 | — | — | — | — | — | — | — | — | — | — | — |
| | | C3 | — | — | — | — | 13.5 | 13.5 | 13.5 | — | — | — | — | — | — | — | — |
| | | C4 | — | — | — | — | — | — | — | — | — | — | — | — | 19 | 19 | 19 |
| | | C5 | — | — | — | — | — | — | — | — | 16.5 | 15.5 | 14.5 | 16.5 | — | — | — |
| Antimony | | D1 | 3 | 3 | 3 | 3 | 3 | 3 | 3 | 3 | 3 | 3 | 4 | 5 | — | 3 | 3 | 3 |
| | | D2 | — | — | — | — | — | — | — | — | — | — | — | — | 4 | — | — |
| heat stabilizer | | | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| flame retardancy | | 1/16" | V0 | V0 | V0 | V0 | V0 | V0 | V0 | V0 | V0 | V0 | V0 | V0 | V0 | V0 | V0 |
| | | 1/12" | V0 | V0 | V0 | V0 | V0 | V0 | V0 | V0 | V0 | V0 | V0 | V0 | V0 | V0 | V0 |
| | | 1/10" | V0 | V0 | V0 | V0 | V0 | V0 | V0 | V0 | V0 | V0 | V0 | V0 | V0 | V0 | V0 |
| | | 1/8" | V0 | V0 | V0 | V0 | V0 | V0 | V0 | V0 | V0 | V0 | V0 | V0 | V0 | V0 | V0 |
| Impact strength | | ¼" | 15 | 20 | 23 | 17 | 13 | 15 | 13 | 20 | 18 | 16 | 13 | 16.5 | 16 | 14 | 12 |

As shown in Table 2, it can be seen that Examples 8-22 can obtain V0 flame retardancy at every thickness of ⅛" to 1/16" even with a small amount of flame retardant aid.

Comparative Examples 5-11

Comparative Examples 5-11 are prepared by the same method as in the foregoing Examples except that the amounts of some components are changed as in Table 3.

TABLE 3

|  |  |  | Comparative Examples | | | | | | |
|---|---|---|---|---|---|---|---|---|---|
|  |  |  | 5 | 6 | 7 | 8 | 9 | 10 | 11 |
| Epoxy | $A_1$ | A1-1 | — | — | — | — | — | 5 | — |
| group-containing |  | A1-4 | — | — | — | — | — | — | — |
| vinyl copolymer |  | A1-6 | — | — | — | — | — | — | — |
|  |  | A1-7 | — | — | — | — | — | — | 25 |
| Rubber modified | $A_2$ | $A_{21}$ | 30 | 30 | 30 | 30 | 30 | 20 | 35 |
| styrene resin |  | $A_{22}$ | 70 | 70 | 70 | 70 | 70 | — | — |
| Polyester |  | B1 | — | — | — | — | — | 75 | 40 |
|  |  | B2 | — | — | — | — | — | — | — |
|  |  | B3 | — | — | — | — | — | — | — |
|  |  | B4 | — | — | — | — | — | — | — |
| Flame retardant |  | C1 | 20 | — | — | — | — | — | — |
|  |  | C2 | — | 13.5 | — | — | — | 13.5 | — |
|  |  | C3 | — | — | 13.7 | — | — | — | 13.5 |
|  |  | C4 | — | — | — | 23.5 | — | — | — |
|  |  | C5 | — | — | — | — | 17 | — | — |
| Antimony |  | D1 | 7 | 7 | 7 | 7 | 7 | 3 | 3 |
|  |  | D2 | — | — | — | — | — | — | — |
| heat stabilizer |  |  | 0.3 | 0.3 | 0.3 | 0.3 | 0.3 | 0.3 | 0.3 |
| flame retardancy |  | 1/16" | Fail | Fail | Fail | Fail | Fail | Fail | Fail |
|  |  | 1/12" | Fail | Fail | Fail | Fail | Fail | Fail | Fail |
|  |  | 1/10" | V0 | V0 | V0 | V0 | V0 | V0 | V0 |
|  |  | ⅛" | V0 | V0 | V0 | V0 | V0 | V0 | V0 |
| Impact strength |  | ¼ | 20 | 16 | 12 | 16 | 17 | 5 | 6 |

As shown in Table 3, Comparative Examples 5-9 not employing an epoxy group-containing vinyl copolymer and a polyester resin exhibit poor flame retardancy at a thickness of 1/12" and 1/16", respectively, even with an excess amount of flame retardant aid. Comparative Example 10 employing an excess amount of polyester shows poor flame retardancy at a thickness of 1/12" and 1/16", respectively. Comparative Example 10 in which the GMA-SAN resin contains more than 5 mol % of epoxy compound also show deteriorated flame retardancy.

Color Development Test

Example 23

Example 23 is prepared by the same method as in Example 9 except that 0.5 parts by weight of colorant (YELLOW (E1)) is added. The resin pellets are dried at 80° C. for 3 hours, and molded into test specimens having a size of 10 cm×10 cm×3.2 mm using a 6 oz injection molding machine at 180-280° C. with a barrel temperature of 40-80° C. The color development is measured by means of a Minolta CM-3700 D spectrophotometer. The color is determined by *L (Lightness), *a (Red-Green), *b (Yellow-Blue) according to light sources using a 1976 CIE Lab Color Space of International Commission on Illumination. The lower the value of *L is, the better the color development, which means that the sample reveals the color well. The higher the value of *a is, the sample is more red. The lower the value of *b is, the sample is more yellow. The results are shown in Table 4. A photograph of the specimen captured with a digital camera (product name: Nikon coolpix 4700) is shown in FIG. 1(a).

Example 24

Figure 1B:
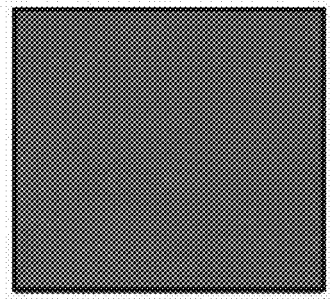

Example 24 is prepared by the same method as in Example 23 except that RED (E2) is used instead of YELLOW (E1). The results are shown in Table 4. A photograph of the specimen captured with a digital camera (product name: Nikon coolpix 4700) is shown in FIG. 1(b).

Comparative Example 12

Figure 2A:
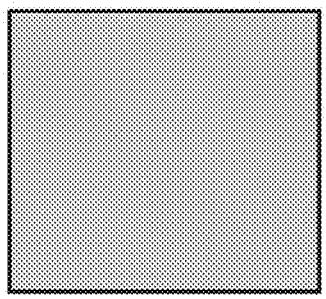
FIG. 2 (*a*) is a photograph of a test specimen prepared in Comparative Example 12 captured with a digital camera, and FIG. 2 (*b*) is a test specimen prepared in Comparative Example 13 captured with a digital camera.

Comparative Example 12 is prepared by the same method as in Comparative Example 6 except that 0.5 parts by weight of colorant (YELLOW (E1)) is added. The resin pellets are dried at 80° C. for 3 hours, and molded into test specimens having a size of 10 cm×10 cm×3.2 mm using a 6 oz injection molding machine at 180-280° C. with a barrel temperature of 40-80° C. The color development is conducted in the same manner as in Examples 23-24. The results are shown in Table 5. A photograph of the specimen captured with a digital camera (product name: Nikon coolpix 4700) is shown in FIG. 2(a).

Comparative Example 13

Figure 2B:
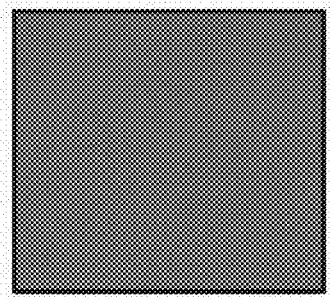

Comparative Example 13 is prepared by the same method as in Comparative Example 12 except that RED (E2) is used instead of YELLOW (E1). The results are shown in Table 5. A photograph of the specimen captured with a digital camera (product name: Nikon coolpix 4700) is shown in FIG. 2(b).

TABLE 4

| light | Example 23 | | | Example 24 | | |
|---|---|---|---|---|---|---|
| source | D65[1] | A[2] | CWF_2[3] | D65 | A | CWF_2 |
| L* | 74.022 | 79.152 | 78.468 | 45.956 | 53.001 | 45.908 |
| a* | 18.748 | 22.067 | 11.142 | 48.141 | 50.069 | 35.638 |
| b* | 73.672 | 79.497 | 82.219 | 20.931 | 33.95 | 20.191 |

[1] D65: Natural daylight
[2] A: tungsten filament lamp
[3] CWF_2: Cool white fluorescent lamp

TABLE 5

| light | Comparative Example 12 | | | Comparative Example 13 | | |
|---|---|---|---|---|---|---|
| source | D65[1] | A[2] | CWF_2[3] | D65 | A | CWF_2 |
| L* | 80.49 | 85.016 | 84.422 | 52.796 | 59.906 | 53.742 |
| a* | 11.539 | 17.311 | 6.386 | 48.331 | 49.569 | 35.569 |
| b* | 78.065 | 81.067 | 86.728 | 22.902 | 36.295 | 23.68 |

[1]D65: Natural daylight
[2]A: tungsten filament lamp
[3]CWF_2: Cool white fluorescent lamp As shown in Tables 4 and 5, Examples 23-24 exhibit better colorability than Comparative Examples 12-13. Further photographs of Examples 23-24 show thick color compared with those of Comparative Examples 12-13.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:
(A) about 60 to about 90 parts by weight of an epoxy group-containing styrenic polymer comprising ($A_1$) 50 to about 100% by weight of an epoxy group-containing vinyl copolymer and ($A_2$) about 0 to 50% by weight of a rubber modified styrenic copolymer resin;
(B) about 10 to about 40 parts by weight of a polyester resin;
(C) about 3 to about 20 parts by weight of a bromine-containing flame retardant, per 100 parts by weight of a base resin comprising (A) and (B); and
(D) about 0.1 to about 6 parts by weight of a flame retardant aid, per 100 parts by weight of a base resin comprising (A) and (B).

2. The thermoplastic resin composition of claim 1, wherein said epoxy group-containing vinyl polymer ($A_1$) is prepared by polymerizing a mixture comprising about 0.001 to about 5.0 mol % of an epoxy group-containing unsaturated epoxy compound ($A_{11}$) and about 99.999 to about 95 mol % of a vinyl compound ($A_{12}$).

3. The thermoplastic resin composition of claim 1, wherein said epoxy group-containing vinyl copolymer ($A_1$) comprises about 0.001 to about 5.0 mol % of an epoxy group.

4. The thermoplastic resin composition of claim 2, wherein said unsaturated epoxy compound ($A_{11}$) is represented by the following chemical formula 1:

[Chemical formula 1]

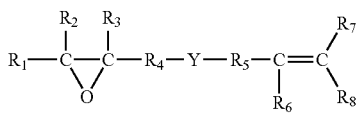

wherein:
$R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or alkyl-substituted aryl; and Y is an ether group (—O—), carboxyl group (—O—[C=O]—, —[O=C]—O—), $C_1$-$C_{12}$ alkylene, $C_6$-$C_{14}$ arylene, or alkyl-substituted arylene;
with the proviso that when Y is an ether group (—O—) or carboxyl group (—O—[C=O]—, —[O=C]—O—), $R_4$ and $R_5$ are each independently $C_1$-$C_{12}$ alkylene, $C_6$-$C_{14}$ arylene or alkyl-substituted arylene; and when Y is $C_1$-$C_{12}$ alkylene, $C_6$-$C_{14}$ arylene or alkyl-substituted arylene, Y represents a (R4-Y-R5) structure.

5. The thermoplastic resin composition of claim 4, wherein said unsaturated epoxy compound ($A_{11}$) is selected from the group consisting of epoxy alkyl acrylate, allyl glycidyl ester, aryl glycidyl ester, glycidyl methacrylate, glycidyl acrylate, butadiene monooxide, vinyl glycidyl ether, glycidyl itaconate and combinations thereof.

6. The thermoplastic resin composition of claim 2, wherein said vinyl compound ($A_{12}$) comprises about 40 to about 90% by weight of an aromatic vinyl monomer and about 10 to about 60% by weight of a monomer copolymerizable with the aromatic vinyl monomer.

7. The thermoplastic resin composition of claim 6, wherein said monomer copolymerizable with the aromatic vinyl monomer is an unsaturated nitrile monomer.

8. The thermoplastic resin composition of claim 1, wherein said rubber modified styrenic copolymer resin ($A_2$) comprises ($A_{21}$) about 20 to about 100% by weight of a graft copolymer resin and ($A_{22}$) about 0 to about 80% by weight of a copolymer resin.

9. The thermoplastic resin composition of claim 1, wherein said rubber modified styrenic copolymer resin ($A_2$) has a Z-average rubber particle size of about 0.1 to about 6.0 µm.

10. The thermoplastic resin composition of claim 1, wherein said polyester resin (B) contains inorganic particles.

11. The thermoplastic resin composition of claim 1, further comprising at least one additive selected from the group consisting of heat stabilizers, dyes, pigments, lubricants, releasing agents, dispersant, anti-dripping agents, weather stabilizers, inorganic fillers, inorganic fibers and combinations thereof.

12. The thermoplastic resin composition of claim 1, wherein said bromine-containing flame retardant (C) is selected from the group consisting of tetrabromobisphenol A, decabromodiphenyloxide, decabrominated diphenyl ethane, 1,2-bis(tribromophenyl)ethane, brominated epoxy oligomer having a molecular weight of about 600 to about 8,000, octabromotrimethylphenyl indane, bis(2,3-dibromopropyl ether), tris(tribromophenyl)triazine, brominated aliphatic or aromatic hydrocarbon and combinations thereof.

13. The thermoplastic resin composition of claim 1, wherein said flame retardant aid (D) is antimony oxide.

14. The thermoplastic resin composition of claim 13, wherein said antimony oxide is antimony trioxide in which at least 50% of the antimony trioxide particles have a size of about 0.01 to about 6 µm or antimony pentoxide in which at least 50% of the antimony pentoxide particles have a size 0.01 to about 1 µm.

15. A molded article comprising a thermoplastic resin composition of claim 1.

16. The molded article of claim 15, wherein said molded article has an Izod notch impact strength of about 18 kgf·cm/cm or more at 23° C. measured in accordance with ASTM D-256 using a ¼" thick test sample.

17. A molded article comprising a thermoplastic resin composition of claim 1, of a base resin comprising (A) and (B), wherein said molded article has a flame retardancy of V0 according to UL 94 VB at a sample thickness of ¹⁄₁₆", ¹⁄₁₂", ¹⁄₁₀" and ⅛" respectively; *L value of less than about 80, *a value of more than about 15, *b value of less than about 75 measured by means of a Minolta CM-3700 D spectrophotometer at a light source of D65 according to light sources using a 1976 CIE Lab; and an Izod notch impact strength of about 12 kgf·cm/cm or more at 23° C. measured in accordance with ASTM D-256 using a ¼" thick test sample.

18. The thermoplastic resin composition of claim 1, comprising ($A_2$) 33 to 50% by weight of a rubber modified styrenic copolymer resin.

19. A thermoplastic resin composition comprising:
(A) about 60 to about 90 parts by weight of an epoxy group-containing styrenic polymer comprising ($A_1$) about 5 to 66% by weight of an epoxy group-containing vinyl copolymer and ($A_2$) 33 to about 95% by weight of a rubber modified styrenic copolymer resin;
(B) about 10 to about 40 parts by weight of a polyester resin;
(C) about 3 to about 20 parts by weight of a bromine-containing flame retardant, per 100 parts by weight of a base resin comprising (A) and (B); and
(D) about 0.1 to about 6 parts by weight of a flame retardant aid, per 100 parts by weight of a base resin comprising (A) and (B).

* * * * *